June 29, 1948. A. A. MARKSON ET AL 2,444,358
APPARATUS FOR MEASURING THE STATE OF COMPRESSION
OF A LIQUID IN A LIQUID VAPOR PHASE SYSTEM
Filed Jan. 18, 1944
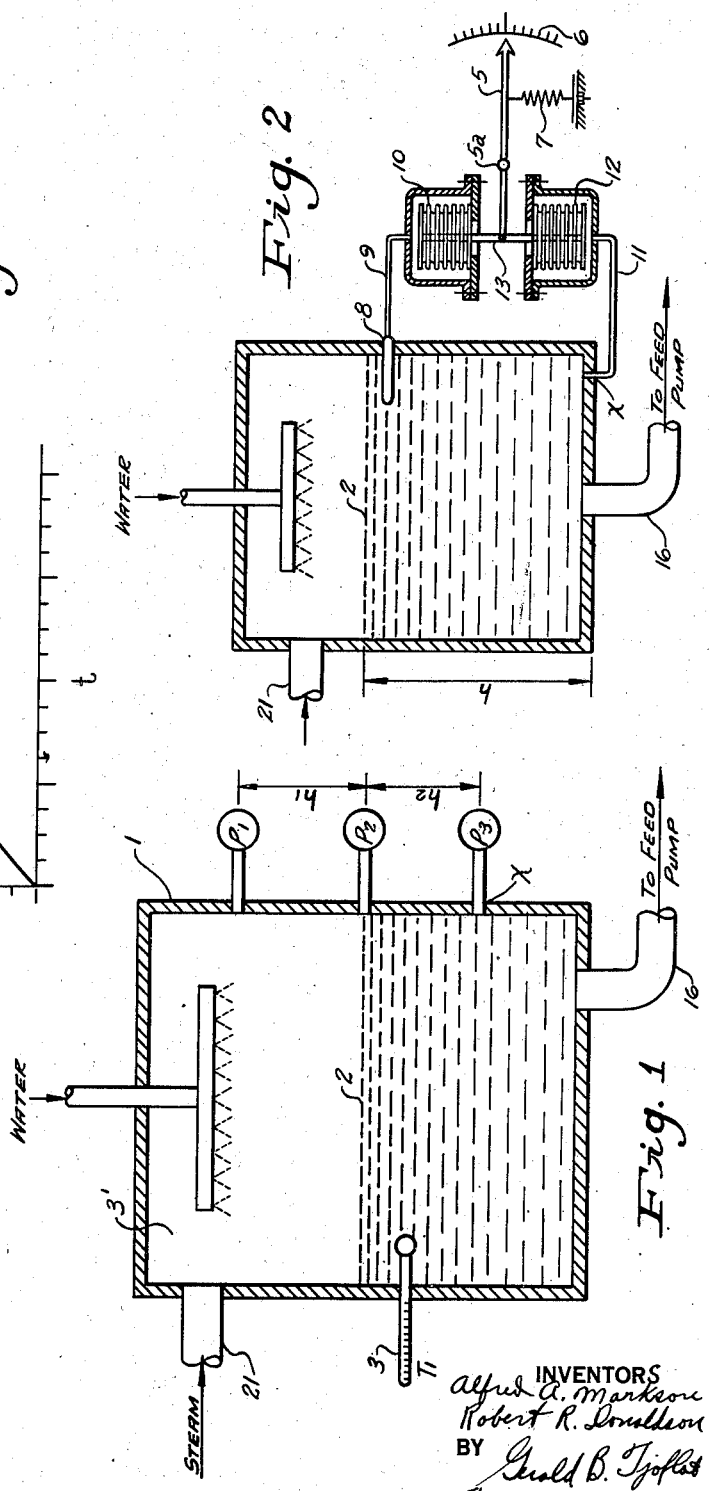
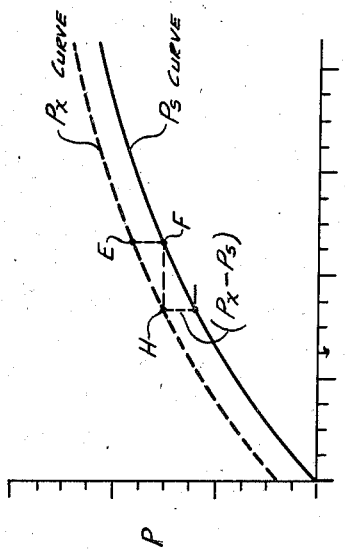
INVENTORS
Alfred A. Markson
Robert R. Donaldson
BY Gerald B. Tjoflat
Their ATTORNEY Patented June 29, 1948

2,444,358

UNITED STATES PATENT OFFICE 2,444,358

APPARATUS FOR MEASURING THE STATE OF COMPRESSION OF A LIQUID IN A LIQUID VAPOR PHASE SYSTEM

Alfred A. Markson, Mount Lebanon, and Robert R. Donaldson, Forest Hills, Pa., assignors to John M. Hopwood, Mount Lebanon, Pa.

Application January 18, 1944, Serial No. 518,698

1 Claim. (Cl. 73—389)

This invention relates to apparatus for measuring the state of compression of a liquid in a liquid vapor phase system.

In accordance with this invention we utilize in its practice the principle that a pure liquid in contact with its own vapor develops a vapor pressure which corresponds uniquely to its temperature so that for every vapor pressure the liquid will have a definite temperature. This is also true of many mixtures and solutions. Under certain conditions the actual measured temperature of a liquid in a vessel may not correspond to this relationship of temperature and pressure for two reasons. One is that the vapor phase may be contaminated by another gas which exerts its own partial pressure and second the pressure may be measured at a point in the liquid where there is considerable hydrostatic head or pressure. The difference between the actual state of the pressure in the liquid and that which corresponds to the unique temperature pressure curve of the liquid will be referred to as the compression of the liquid above its saturation pressure corresponding to its temperature, hereafter referred to as the compression of the liquid.

The present invention provides simple and accurate means for measuring the difference between the actual pressure and the saturation pressure corresponding to the temperature of the liquid, or the compression of the liquid.

In other words, if $P_x$ is the actual absolute pressure at any point in a liquid vapor system and $P_s$ is the saturation pressure which corresponds to the temperature at the same point the instrument will always measure $(P_x - P_s)$.

The foregoing principles have various applications as in boiler feed water heaters where the problem is encountered of preventing the feed water from flashing into steam at the suction of the boiler feed pumps, resulting from the vapor pressure in the heater decreasing to a point where the state of compression of the liquid is reduced to the point where the liquid would flash into steam or otherwise seriously increase pump cavitation.

An object of this invention is the provision of means for measuring the actual absolute pressure at any desired point in a liquid vapor system and the saturation pressure of the liquid corresponding to its temperature at the same point or other desired point and thereby determine the difference between such pressures.

The foregoing and other objects, as well as other applications of the invention, will be apparent from the following description taken in conjunction with the accompanying drawings, in which:

Fig. 1 is a diagrammatic view illustrating the temperature and pressure relationship in a liquid vapor system, for example, a closed contact feed water heater, and its application in the practice of the invention;

Fig. 2 is a similar view illustrating how, in accordance with the invention, a measurement of the difference between the absolute pressure of the liquid and the saturation pressure of the liquid corresponding to the temperature of the liquid, may be obtained; and Fig. 3 is a diagrammatic illustration of a pressure temperature and saturation curve for a liquid vapor system.

In the diagrammatic view of Fig. 1, the numeral 1 designates a container for a liquid the level of which is designated by the numeral 2. Container 1 may be a closed contact boiler feed water heater supplied with steam for heating water supplied thereto and an outlet through which the feed water passes to the boiler feed pump (not shown). A thermometer 3 extends into the liquid whose temperature reading would give a true measure of the pressure if there were no static head or partial vapor pressure or vapor and air pressure in the vapor space 3'. In Fig. 1, $P_1$, $P_2$, and $P_3$ designate pressures at different points in container 1. The pressure $P_1$ in the space 3' above the level of the liquid includes the partial pressure of air in the container as well as the vapor pressure; the pressure $P_2$ is the same as $P_1$, and the pressure $P_3$ represents the actual pressure of the liquid at any point $x$, and is a function of the temperature of the liquid and the sum of the static head $h_2$ and pressure $P_1$ represented also as $h_1$.

In Fig. 2, the arrangement illustrated provides means for indicating the difference between the actual absolute pressure of the liquid at any point, as at point $x$, and the saturation pressure of the liquid corresponding to its temperature. This difference may be expressed as $(P_x - P_s)$, where $P_x$ is the total or actual absolute pressure existing at point $x$ and $P_s$ is the saturation pressure of the liquid corresponding to its temeprature. In Fig. 2, a pointer 5 indicates the difference $(P_x - P_s)$ by means to be described. Pointer 5 is fulcrumed at 5a and is mounted to sweep over a scale 6 calibrated suitably in terms of $(P_x - P_s)$. A spring 7 may be utilized to bias the pointer in a desired manner.

The saturation pressure of the liquid correponding to its temperature is developed by means of a container 8 disposed in the liquid of the container, pressure responsive element 10 and a connecting tube 9. Container 8, tube 9, and bellows 10 comprise a sealed system. A liquid is introduced into container 8—this liquid being of the same kind as the liquid in container 1—and the system is exhausted of air so that the pressure developed by vaporization of the liquid will represent the saturation pressure of the liquid at its temperature.

The pressure of the liquid $P_x$ in container 1 is measured by means of a pressure responsive element 12 and a tube 11 connected to the liquid at any desired point as at $x$. The pressure at $x$ includes the pressure $h_1$ and $h_2$ that is the sum of these pressures. Bellows 10 and 12 are connected together by a strut 13 which is turn is connected to pointer 5 so that as the strut is moved in response to the differential expansion or contractions of bellows 10 and 12, the pointer is positioned to indicate the difference $(P_x - P_s)$.

If the liquid in the vapor pressure tube or container 8 is a pure liquid and if tube 8, conduit 9, and the pressure space about bellows 10 is exhausted of air and extraneous gases, and if the liquid in container 8 is the same as that in container 1, the liquid in tube 8 will have a pure vapor phase; therefore, the pressure developed by vapor from the liquid in tube 8 will be its saturation pressure corresponding to the temperature of the liquid.

Since the liquid in tube 8 is not exposed to the static pressure of the liquid in container 1, the pressure on bellows 10 is a function of the temperature of that liquid only. However, the pressure $P_s$ of the vapor exerted on bellows 10 is acted upon differentially by the total pressure $P_x$ of the liquid in container 1 by communication of the liquid through conduit 11 with the bellows 12 and the resulting displacement of the indicator 5 would be proportional to $(P_x - P_s)$ and indicate the state of compression of the liquid at the point $x$.

In Fig. 3, curve $P_x$ represents the total pressure temperature relation of the liquid existing at any point $x$ in a liquid vapor system, i. e. in a system where the vapor is in contact with its mother liquid, and curve $P_s$ represents the saturated pressure of the liquid corresponding to its temperature. Thus it will be seen that if the total pressure $P_x$ is decreased from say point E, curve $P_x$ to F, curve $P_s$, that the temperature of the liquid must be cooled from temperature $t_{EF}$ to $t_H$ in order to maintain the liquid in a state of compression at which the liquid will not flash into vapor.

The pressure differential or compression of the liquid may be usefully applied to regulate the feed water supply to a boiler so as to prevent flashing of the feed water into steam or excessive cavitation, in feed water pumps. It is well known that the bleed pressure is high at high turbine loads and that if the load suddenly drops, high temperature and low static pressure results in feed water heaters causing feed water to flash into steam at the suction of the boiler feed pumps and in the pumps also. By utilizing a device for measuring and controlling the compression of the liquid in the boiler feed line the compression of the liquid may be indicated and the condition corrected. This is also known as maintaining an effective submergence of the pump suction.

Having thus described the invention, what we desire to claim and secure by Letters Patent is:

Apparatus for measuring the state of compression of a liquid at any predetermined point in a liquid vapor system comprising a pressure actuated device having pressure receiving chambers provided with flexible means responsive to changes in the value of pressure in said chambers and adapted to deflect in response to the difference between the pressures in said chambers, means operatively connected to said flexible means for indicating the differential between the pressures acting thereon, a container, a tube connected to said container and one of said receiving chambers, the container having liquid therein whose saturation pressure at the temperature of the liquid in said system is substantially equal to that of the latter, said container, receiving chamber and tube connecting the same being substantially exhausted of air and sealed, said other receiving chamber being provided with means for connecting the same to the liquid vapor system so as to render the same responsive to the pressure of the liquid therein at said predetermined point, whereby one of said receiving chambers is exposed to a vapor pressure corresponding to the saturation pressure of the liquid in the system at the temperature of said liquid, and the other of said chambers is subjected to the pressure of the liquid in said system at said predetermined point.

ALFRED A. MARKSON.
ROBERT R. DONALDSON.

REFERENCES CITED

The following references are of record in the file of this patent:

UNITED STATES PATENTS

| Number | Name | Date |
| --- | --- | --- |
| 943,260 | Lothrop et al. | Dec. 14, 1909 |
| 1,248,698 | Murray | Dec. 4, 1917 |
| 1,446,097 | Lindbom et al. | Feb. 20, 1923 |
| 1,531,258 | Kieser | Mar. 24, 1925 |
| 1,545,938 | Bren | July 14, 1925 |
| 1,804,212 | De Giers | May 5, 1931 |
| 1,819,244 | Jacobus | Aug. 18, 1931 |
| 1,917,810 | Reynoldson | July 11, 1933 |
| 2,068,663 | Diehl | Jan. 26, 1937 |
| 2,091,848 | Eggers | Aug. 31, 1937 |
| 2,152,979 | Schwander | Apr. 4, 1939 |
| 2,185,803 | Diedrich | Jan. 2, 1940 |
| 2,200,471 | Dickey | May 14, 1940 |
| 2,268,469 | Barnhart | Dec. 30, 1941 |
| 2,335,250 | Adlam | Nov. 30, 1943 |

FOREIGN PATENTS

| Number | Country | Date |
| --- | --- | --- |
| 11,798 | Great Britain | May 12, 1910 |